(12) United States Patent
Nguyen et al.

(10) Patent No.: US 6,917,504 B2
(45) Date of Patent: Jul. 12, 2005

(54) APPARATUS AND METHOD FOR ADAPTIVELY CONTROLLING POWER SUPPLIED TO A HOT-PLUGGABLE SUBSYSTEM

(75) Inventors: James Hung Nguyen, San Jose, CA (US); Sang Ton Ngo, Cupertino, CA (US); David Chalmers Schia, Cupertino, CA (US); Ladislas G. Kerenyi, White Plains, NY (US); Khai Minh Le, Saratoga, CA (US)

(73) Assignee: Supertex, Inc., Sunnyvale, CA (US)

( * ) Notice: Subject to any disclaimer, the term of this patent is extended or adjusted under 35 U.S.C. 154(b) by 868 days.

(21) Appl. No.: 09/846,478

(22) Filed: May 2, 2001

(65) Prior Publication Data

US 2002/0166073 A1 Nov. 7, 2002

(51) Int. Cl.[7] ................................................ H02H 3/00

(52) U.S. Cl. ............................ 361/100; 361/18; 361/58

(58) Field of Search ............................ 361/18, 100, 91, 361/90, 115, 58

(56) References Cited

U.S. PATENT DOCUMENTS 5,559,423 A * 9/1996 Harman ...................... 323/277

* cited by examiner

Primary Examiner—Stephen W Jackson
(74) Attorney, Agent, or Firm—A. Mitchell Harris; Jeffrey D. Moy; Weiss, Moy & Harris, P.C.

(57) ABSTRACT

An apparatus and method for adaptively controlling power supplied to a hot-pluggable subsystem controls the inrush current of the hot-pluggable subsystem when the subsystem is coupled to another system that supplies power, and optionally other signal connections. The apparatus and method adaptively control a pass device by detecting the voltage at the gate of the pass device during initial charging of the gate. The gate voltage may be sampled and used subsequently to control the operation of the pass device, and short-circuit conditions may be detected by determining that the miller effect does not change the charging of the gate capacitance. Automatic restart circuitry can be included to generate multiple startup attempts, and under-voltage lock-out circuitry and power-on-reset timers can be used to provide a robust solution. The apparatus and method can be adapted to provide a three terminal device that does not require a feedback connection from a power supply output. The three terminal device may include the pass device, or may control an external pass device.

25 Claims, 4 Drawing Sheets

APPARATUS AND METHOD FOR ADAPTIVELY CONTROLLING POWER SUPPLIED TO A HOT-PLUGGABLE SUBSYSTEM

BACKGROUND OF THE INVENTION

1. Field of the Invention

The present invention relates generally to power supplies, and more specifically to a method and apparatus for adaptively controlling power supplied to a hot-pluggable subsystem.

2. Background of the Invention

Computers and other electronic systems such as telecom systems require replacement and/or addition of subsystems without removing power from a host system. Known as "hot-pluggable" subsystems, these electrical devices must operate properly after connection and disconnection, while not disrupting the operation of other electronic circuits. Telecom systems typically operate at a much higher voltage (−48V) and telecom subsystems typically have high current drains due to the low-impedance nature of telephony circuits. Thus, the input capacitances required to filter EMI and conducted ripple on the input of telecom subsystems are typically large and a hot-pluggable subsystem for telecom generally requires sophisticated inrush current protection.

Additionally, peripheral devices, storage devices and redundant processor modules in both network server systems and personal computing systems can be removed or attached while the systems remain active. Network connections between systems must also support active connection and disconnection, since the entire network should not be shut down to add or remove computers or other devices. Power to connected sub-systems may be supplied through network interface cables. For example, the Powered Ethernet Specification 802.3 promulgated by the Institute of Electrical and Electronic Engineers (IEEE), specifies an interface wherein power is supplied through the network cable connection. Hot-pluggable network hubs, network telecom cards including fiber optic interfaces, transceivers and cards for analog telephonic interfaces may all be powered by a host system.

Inrush current must be managed in hot-plugging systems, as the transients generated when the hot-pluggable subsystem is connected to the host system can damage connectors, cause dips in the power supply rails and generate electromagnetic interference (EMI) that affect the operation of the host system and other connected subsystems.

Power supplies for hot-pluggable subsystems having a minimum of electrical connections and incorporated within small integrated circuit packages are very desirable. In general it is useful to provide power supply integrated circuits requiring a minimum of circuit area and external connections. Generally, an external pass element is used with an integrated circuit controller so that the controller may be used in many different applications with the pass element sized appropriately for the current and voltage requirements of a particular application. As the size and the equivalent input capacitance of the pass element used is not known a priori, therefore it would be desirable to compensate for differences in the size of the pass element in order to normalize turn on time and other characteristics without requiring external components specifically chosen for a given pass element.

Power supplies for a hot-pluggable subsystem are typically required to provide a stable time period in which the power supply voltage applied to the hot-pluggable device does not vary while the hot-pluggable device initializes. This presents difficulty in that mechanical contact bounce may electrically connect and disconnect the power supply conductors several times before the device is properly coupled. A de-bounce time interval and/or a power-on-reset (POR) time interval are typically provided to prevent improperly initializing a hot-pluggable subsystem, but implementation of the de-bounce and power-on-reset time intervals typically requires additional components, adding to size, complexity and cost of power supply electronics.

Other features desirable in a power supply for coupling to a hot-pluggable sub-system are short-circuit protection (or current limiting) to prevent misalignment or accidental shorting of the power supply pins from damaging the power supply or hot-pluggable subsystem. Short-circuit protection differs from inrush current protection in that short-circuit protection must distinguish from a transient short-circuit type load (virtual AC short circuit) that is produced by the large input capacitors of hot-pluggable subsystem power supplies or bypass capacitors. The pass device used in a hot-pluggable power supply can fail or be degraded in operating characteristics and reliability if a short circuit is placed across the output terminals of a hot-pluggable power supply.

Typically, implementation of short-circuit discrimination vs. current limiting requires additional complexity within the power supply control circuits and additional components to set operating levels, etc. Large capacitors are required to prevent startup transients from turning on the pass device through the parasitic capacitances of the pass device. Short-circuit protection circuits as well as current limiting circuits are generally desirable with an auto-restart feature so that input power does not have to be removed in order for the hot-pluggable power supply to recover from the protection conditions. Auto-restart circuits typically require external timing components, and due to the long time constants desired, auto-restart circuits typically use large capacitors.

Under-voltage lockout (UVLO) protection is also desirable in hot-pluggable systems, so that the hot-pluggable sub-system power supply does not produce an output until the power supply input has reached a minimum voltage level.

Therefore, it would be desirable to provide an improved method and system for adaptively controlling power supplied to a hot-pluggable subsystem. It would be further desirable to control power supply current during initialization and mechanical contact bounces without requiring additional timing components, external connections and external components to support operational features. It would be further desirable to provide an auto-restart capability after a short circuit has been detected across a load, without requiring additional components or external circuit connections.

It would additionally be desirable to incorporate UVLO protection and turn-on short-circuit protection without requiring additional external connections. It would further be desirable to provide the above-mentioned features within a small integrated circuit package having a minimum of electrical connections.

SUMMARY OF THE INVENTION

The above objective of adaptively controlling power supplied to a hot-pluggable subsystem is achieved in a method and apparatus. The apparatus includes a pass device for controlling a power supply output and a control circuit coupled to a gate of the pass device. The control circuit controls charging of the gate of the pass transistor in conformity with a detected gate voltage of the pass transistor.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
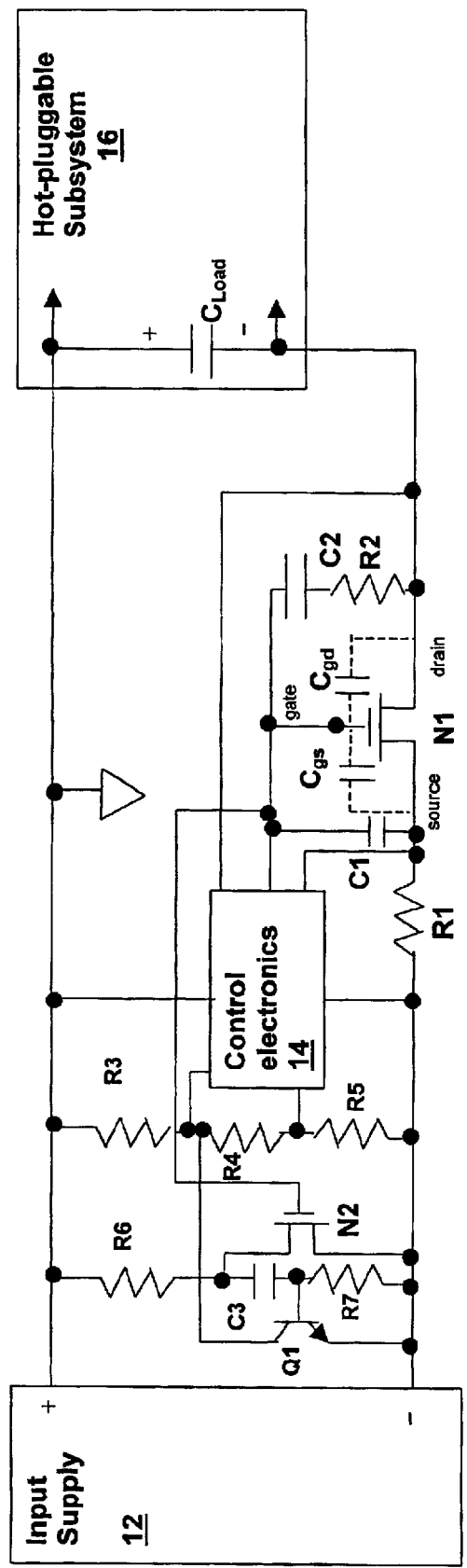
FIG. 1 is a schematic diagram depicting a prior art power supply for a hot-pluggable subsystem.

Referring to FIG. 1, a prior-art power supply for a hot-pluggable subsystem is depicted. An input supply 12, provides a source of power for operation of internal components of the power supply and for supplying power to a hot-pluggable subsystem 16. A pass device N1, controls current supplied to $C_{Load}$ and thus the power supplied to hot-pluggable subsystem 16. A control electronics 14 controls the gate of pass device N1, so that startup characteristics can be managed. A feedback connection from the drain terminal of pass device N1 that is coupled to hot-pluggable subsystem 16 is provided to permit control of pass device N1. A feedback network formed by capacitor C2 and resistor R2 are typically provided to control inrush current, as the charging of $C_{Load}$ will be proportional to the current supplied by control electronics 14 to discharge capacitor C2. Capacitor C1 is required to prevent the momentary connection of hot-pluggable sub-system 16 from turning on pass device N1 via a capacitive voltage divider comprising capacitances $C_{gs}$, $C_{gd}$ and $C_{Load}$, since the presence of capacitor C2 enhances the $C_{gd}$ divider effect. Resistor R2 is added to reduce the effect of the capacitive divider by providing a fixed-frequency impedance in series with capacitor C2.

Since capacitances $C_{gs}$ and $C_{gd}$ are relatively small parasitic capacitances associated with pass device N1 and capacitance $C_{Load}$ is typically very large (generally the input capacitor of a power converter), without the presence of capacitor C1, the voltage at the gate of pass device N1 would initially rise rapidly, causing current to flow through pass device N1 before the control circuitry has initialized and can drive the gate of pass device N1 to ground.

Although it is mentioned above that $C_{gd}$ is relatively small, the total gate capacitance of some power metal oxide semiconductor field effect transistors (MOSFETs) is on the order of 1000 picofarads. In order for the power supply of FIG. 1 to operate properly, capacitor C1 must be made quite large (on the order of 0.1 microfarad for larger pass devices) to prevent conduction of pass device N1 during the startup transient. Also, capacitor C2 which may have a value on the order of nanofarads must withstand the voltage difference between the output of the hot-swap power supply (typically −48V) and ground. The capacitors required to implement the prior art circuit are too large for practical inclusion within a power control integrated circuit, and therefore an external terminal for connection of external components is necessary.

Under voltage and overvoltage protection are provided in the prior art circuit of FIG. 1 by a resistor ladder formed by a resistor R3, a resistor R4 and a resistor R5. The junction of resistor R3 and resistor R4 is coupled to an undervoltage control input of control electronics 14. The junction of resistor R4 and resistor R5 is coupled to an overvoltage protection input. A window comparator (with hysteresis to eliminate ringing around the trigger point) or other suitable circuit can be used to determine whether or not an overvoltage or undervoltage condition exists by comparing the undervoltage and overvoltage inputs to a reference voltage within control electronics 14.

Short-circuit protection and current limiting of input supply 12 and pass device N1 is provided by control electronics 14. Short-circuit protection typically is provided by a current sense resistor R1 which provides a voltage to control electronics 14 that is proportional to the current passing through pass element N1. If the load is shorted during turn-on of pass device N1, the voltage across sense resistor R1 rises quickly causing control electronics 14 to quickly turn off pass element Ni before pass element N1 can be damaged. Control electronics 14 must distinguish between normal in-rush current cause by a large load capacitance and a starup short-circuit current condition in order to prevent the hot-swap connection from activating the short-circuit protection within control electronics 14.

Auto-restart circuitry is implemented in the prior art circuit of FIG. 1 by a one-shot circuit comprising resistors R6 and R7, a capacitor C3, a transistor Q1 and a transistor N2. When a short-circuit or over-limit current condition is detected via sense resistor R1, the gate of pass device N1 is pulled low, turning off transistor N2. Once transistor N2 is turned off, capacitor C3 charges exponentially through resistor R6 and resistor R7. The displacement current through capacitor C3 causes a voltage drop across resistor R7, turning on transistor Q1. Therefore, while capacitor C3 is charging, the over-voltage set input of control electronics 14 is pulled low, effectively holding control electronics 14 in a reset condition. When capacitor C3 is charged almost completely, the current through resistor R7 falls below the threshold $V_{be}$ of transistor Q1 and the over-voltage set input rises to its nominal value without the connection of transistor Q1.

Since the output of input supply 12 is still within proper range for operation of the prior art hot swap power supply, the control electronics will restart operation. When operation is restarted, pass device N1 will turn on until the voltage across sense resistor R1 again exceeds a threshold.

Figure 2:
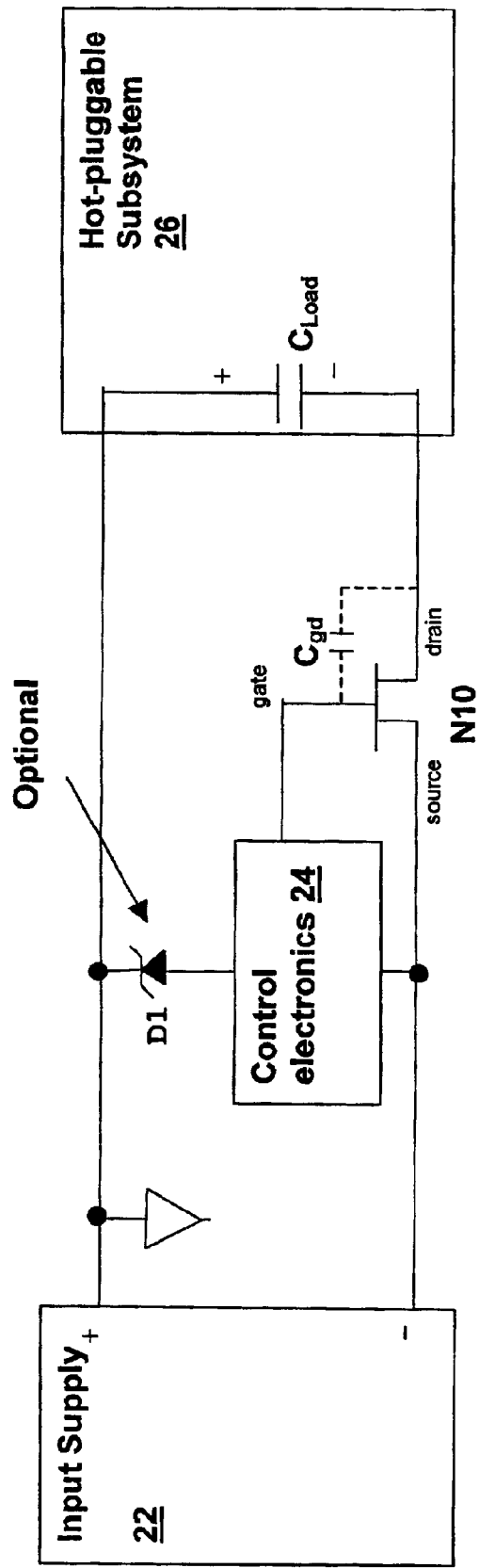
FIG. 2 is a schematic diagram depicting a power supply for a hot-pluggable subsystem in accordance with a preferred embodiment of the invention.

Referring now to FIG. 2, a power supply for a hot-pluggable subsystem in accordance with a preferred embodiment of the invention is depicted. While the illustrative embodiment depicted in the drawings and the following description is directed toward a negative voltage power supply having an N-channel pass device in the return path, one of ordinary skill in the art will understand that the techniques and apparatus described herein can be adapted to other types of power supply without undue experimentation. For example, the techniques of the present invention may be adapted to a positive voltage power supply, a power supply having a pass device in the ground path, or a power supply having a p-channel pass device by re-arranging the polarity of operation of the control electronics and types of pass element.

It should be noted for the embodiments of the present invention as depicted in the following figures, that the pass device and control electronics may be incorporated within a host system or a hot pluggable system or both. For example, in a Powered Ethernet environment, it is useful to provide a hot-pluggable power control device within the host system to provide short-circuit protection and other features such as contact de-bounce and inrush current control, while also providing a second power control device within the hot-pluggable subsystem itself. This second power control device is used to "hold off" current drain or any load impedance for a time period during startup, since the Powered Ethernet specification requires "discovery" of a specific impedance signature before turn on and before a hot swapping function may occur. Typically these functions are provided by circuits designed to perform the particular tasks required on each side of the hot-pluggable subsystem connector, but as will be illustrated for the embodiments of the present invention, an integrated circuit performing functions required on each side of the connector can be an identical device, wherein differing portions of the full functionality of the device are utilized on the different sides of the connector.

Referring again to FIG. 2, an input supply 22, provides a source of power for operation of internal components of the power supply and for supplying power to a hot-pluggable subsystem 26. A pass device N10, controls power supplied to a hot-pluggable subsystem 26. Pass device N10 may be a MOSFET, JFET, GAsFET, Germanium FET, IGBT or other suitable control device having an essentially capacitive gate characteristic. A control electronics 24 controls the gate of pass device N10, so that startup characteristics can be managed.

Control electronics 24 may be coupled to input supply 22 through an optional zener diode D1. Zener diode D1 may be a string of diodes, a voltage regulator, zener diode or other device that permits setting the input supply voltage terminal to a voltage other than that of the output of input supply 22. Since control electronics 24 contains an internal voltage sensing circuit that determines the under-voltage lockout voltage level, the undervoltage lockout level may be programmed through the use of an external device such as zener diode D1. If zener diode D1 or other device is not used, the input power supply terminal of control electronics 24 is coupled directly to the output of input supply 22 and control electronics 24 will use its own internal under-voltage lockout level. As an example, if the output of input power supply 22 is −48V and optional zener diode has a breakdown voltage of 27V and the internal under-voltage lockout threshold is 8V, the startup voltage for control electronics 24 will be 35V. In this manner, the internal under-voltage lockout level may be set to the minimum voltage required for control electronics 24 to operate and properly control the gate of pass device N10. Since this voltage is generally very low compared to the input power supply 22 output voltage, a wide range of startup voltages may be programmed.

In the preferred embodiment of the present invention, a feedback connection from the drain terminal, which is coupled to hot-pluggable subsystem 26, is not required to control pass device N10 during startup, since the rate of voltage rise of the gate of pass device N10 may be set within control electronics 24 and thus within an integrated circuit containing the hot-swap power supply. Therefore, a three-terminal power control device may be implemented in accordance with embodiment of the present invention that either incorporates pass device N10 internally or connects pass device N10 externally.

Without the techniques of the present invention, a power control device having an external pass element and including inrush protection and startup short circuit protection having only three terminals is not possible and current must be sensed externally. If pass device N10 is incorporated internally, its drain terminal becomes the third terminal (rather than the gate terminal) and current can be sensed through a current mirror from the on board pass device.

The present invention reduces interconnect requirements and the need for a large external capacitor by using a novel mechanism to measure the operation of pass device N10. Rather than typical feedback provided from the drain-gate connection, the present invention determines characteristics of pass device N10 by detecting a gate voltage of pass device N10.

Control electronics 24, pass device N10, and any other associated components forming a hot-pluggable power supply can be incorporated within a host system, a hot-pluggable subsystem or both. As illustrated in the above-disclosed example for powered ethernet, a hot-pluggable power supply can be incorporated in a host system to perform some functions and within a hot-pluggable subsystem to perform other functions.

Figure 3:
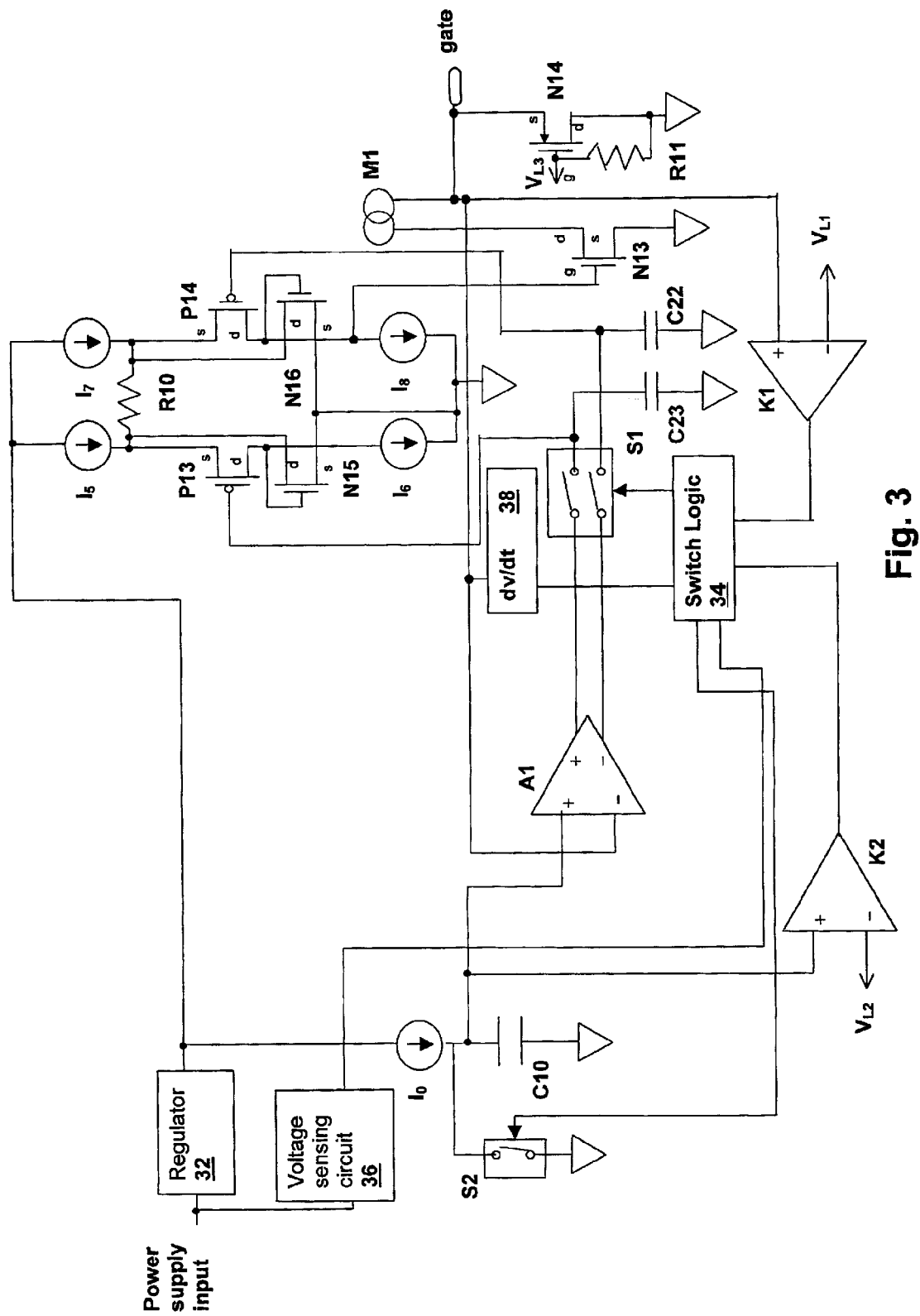
FIG. 3 is a schematic diagram depicting details of the control electronics of FIG. 2.

Referring now to FIG. 3, details of the control electronics of FIG. 2 are depicted. A regulator 32 provides internal regulated power for the control electronics. Current source $I_0$ and capacitor C10 provide a ramp generator that is coupled to the non-inverting input of an amplifier A1. Amplifier A1 is a common-mode feedback circuit having a low difference mode gain. Amplifier A1 sets the common-mode operating voltage that is coupled to capacitors C22 and C23. The inverting input of amplifier A1 is coupled to the gate terminal of control electronics 24, providing a feedback path from the gate of pass device N10. Amplifier A1 has an inverting output coupled to capacitor C22 through switch S1 and a non-inverting output coupled to capacitor C23 through switch S1, so that when switch S1 is closed, the voltages on capacitors C22 and C23 have a difference that represents the loop error controlling the voltage on the gate terminal. When switch S1 is open, the above-described circuit acts to cancel leakage through capacitors C22 and C23, which is critical to circuits where capacitors C22 and C23 are integrated circuit capacitors. Since capacitors C22 and C23 can be made as interwoven capacitors within a "sea" of matched unit devices, their leakage is closely matched, providing a differential hold signal that is stable after switch S1 is opened.

The difference between the voltage on capacitor C22 and the voltage on capacitor C23 is sensed by a transconductor formed by transistors N15, N16, P13, P14 and current sources $I_5$, $I_6$, $I_7$, and $I_8$. N-channel FETs N15 and N16 are matched, as are P-channel FETS P13 and P14. Current sources $I_5$ and $I_7$ are of equal magnitudes, as are currents $I_6$ and $I_8$. The above conditions provide a transconductor that will match the voltage of the ramp generator implemented by current source $I_0$ and capacitor C10, with the voltage at terminal gate, which is provided for connection to the gate of pass device N10 of FIG. 2, by controlling the magnitude of the gate current flowing into the gate of pass device N10 of FIG. 2. Other circuits, such as operational transconductance amplifiers or voltage-current converters may be used to produce a similar result as produced by the transconductor used in the preferred embodiment of the present invention.

The drain of transistor P14 is coupled to the gate of transistor N13, which in turn controls a current mirror M1 having an output coupled to the gate terminal. Current mirror M1 controls the current flowing into the gate of pass device N10 of FIG. 2. Assuming that the gate output is initially low, the voltage on the gate of transistor P14 will cause a voltage drop across resistor R10 which is coupled from the source of transistor P14 to the source of transistor P13. The resulting current through resistor R10 flows into the drain of transistor N16, generating a voltage from the source to drain of transistor P14, which is coupled to the gate of transistor N13. Transistor N13 has characteristics that are matched with the characteristics of transistor N16. Therefore the current flowing through N16 is mirrored at the input of current mirror M1 by transistor N13.

Current mirror M1 forces a current into the gate of a pass element coupled to the gate terminal (such as pass device N10 of FIG. 2) thus producing a closed loop. The time constant of the loop is set to permit the current charging the gate of a pass device to produce a voltage which matches the ramp voltage produced across capacitor C10 by the time a voltage of $V_{L2}$ (which is set at 1V or another suitable voltage less than the typical threshold voltage of pass elements that might be used with the circuit) is reached on the gate terminal. The loop acts to equalize the voltage on the gate of transistor P13 and the voltage on the gate of transistor P14 by changing the voltage on the gate of transistor N13, otherwise the current produced through resistor R10 is zero and no change occurs in the voltage of the gate of transistor N13.

Before the threshold voltage of pass device N10 of FIG. 2 is reached, a comparator K2 detects that the ramp generator voltage has reached the threshold voltage $V_{L2}$. The output of comparator K2 is coupled to switch logic 34 and switch logic 34 opens switch S1 in response to comparator K2 detecting that the ramp generator voltage has reached the threshold voltage $V_{L2}$. A capacitor C22 and a capacitor C23 are coupled to outputs of switch S1 and to the transconductor formed by transistors N15, N16, P13, P14 and current sources $I_5$, $I_6$, $I_7$, and $I_8$.

The voltage on the gate of transistor N13 is held constant by the transconductor, since the voltage difference across capacitors C22 and C23 is constant. Any leakage from capacitors C22 and C23 will be equal and therefore will not affect the voltage difference. The differential voltage across capacitors C22 and C23 is the voltage required to cause the transconductor to produce a voltage on the gate of transistor N13 that maintains the charging rate of the gate of pass device N10 of FIG. 2 to match the voltage across ramp generator capacitor C10. In this manner, the charging current is normalized to match the rate of change of the ramp generator output, creating a consistent ramp profile independent of the device characteristics of pass device N10 of FIG. 2. Additionally, the operation of the circuit overcomes leakage that might cause a non-adaptive scheme to never turn on. Thermal compensation, pass device size and pass device characteristic compensation are provided to a first order approximation.

If pass device N10 of FIG. 2 is incorporated within a power control integrated circuit that contains control electronics 24, a current mirror transistor may be added having a threshold voltage matched to the threshold voltage of pass device N10 of FIG. 2. The current mirror transistor has a gate coupled to the gate of pass device N10 and generates a much smaller current that is proportional to the current through the channel of pass device N10, providing a reference current that may be used to detect current levels for turn-on short circuit protection and operating short circuit protection. The reference current may also be used to scale charging current $I_0$ providing a ramp that is scaled to the characteristics of pass device N10. This reference mirror effectively detects the gate voltage of pass device N10 and provides control in conformity with the gate voltage by creating a scaled current proportional to the gate voltage of pass device N10.

Figure 4:
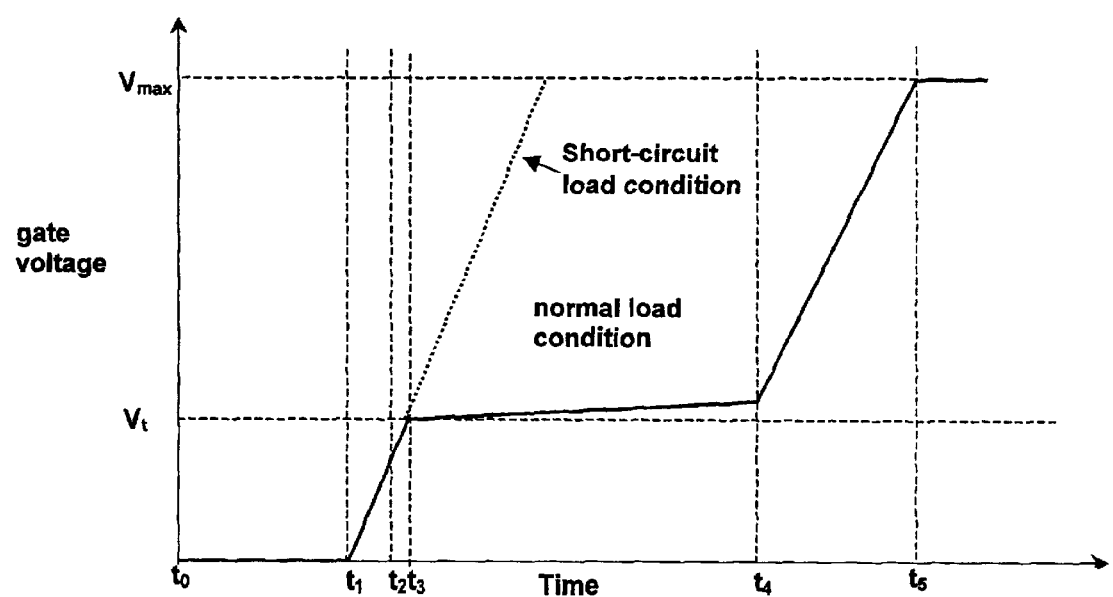
FIG. 4 is a pictorial diagram depicting a gate voltage of the pass device during operation of the power supply of FIG. 2.

Referring now to FIG. 4, the novel operation of the present invention is depicted by showing a unique gate voltage characteristic associated with the operation of the circuits of FIG. 2 and FIG. 3. From time $t_0$ until time $t_1$, the gate voltage of pass device N10 of FIG. 2 is held a ground potential due to the operation of a power-on-reset delay and/or an under-voltage lockout condition during which the charging of capacitor C10 is held off. At time $t_1$ current source $I_0$ begins charging capacitor C10. At time $t_2$, comparator K2 detects that the ramp voltage has crossed the threshold level $V_{L2}$ and the sample-hold action of switch S1 and capacitors C22 and C23 holds the gate charging current constant at a rate required to match the ramp across capacitor C10 by maintaining a constant voltage on the gate of transistor N13. At time $t_3$, the threshold voltage of pass device N10 of FIG. 2 is reached and the Miller effect causes the parasitic $C_{gd}$ of pass device N10 to be multiplied by the gain of pass device N10. This increase in effective capacitance causes the voltage ramp at the gate of pass device N10 to change from the steep characteristic seen from the time period from $t_1$ to $t_3$ to an almost unchanging voltage characteristic. This unchanging characteristic continues until the load capacitance $C_{Load}$ of hot pluggable subsystem 25 has fully charged at $t_4$ when the drain voltage of pass device N10 of FIG. 2 stops changing and the effective capacitance of the gate of pass device N10 returns to its nominal value without the Miller effect. From time $t_4$ to time $t_5$ the rate of change of the gate voltage of pass device N10 again increases until the gate voltage reaches the full value produced at the gate terminal of control electronics 24.

In contrast to the above-described circuit operation, if a short-circuit condition exists across load capacitance $C_{Load}$, the drain of pass device N10 of FIG. 2 will not change and the Miller effect will not occur. Therefore, the gate voltage of N10 will continue to rise at the previously adapted rate (the rate of rise from $t_1$ to $t_3$) as noted by the dashed line labeled "short circuit load condition." A short-circuit detector is implemented by comparator K1, which has a threshold voltage $V_{L1}$. A short-circuit condition is detected if comparator K1 switches before time $t_4$. The reference voltage input $V_{L1}$ is determined by empirical tests of standard pass elements. In response to detecting a short-circuit startup condition, switch logic 34 may restart operation by discharging capacitor C10 through a switch S2 and discharging the gate of pass device N10 of FIG. 2 through transistor N14, resetting the hot-swap controller. Switch logic then delays the restart operation using an internal timer which is generally a timer having a period longer than the power-on reset delay. The circuit would again begin operation from time $t_0$ and the above-described behavior will repeat until the short-circuit condition is removed. As the operation of control electronics 24 is scaled to the characteristics of pass device N10 of FIG. 2, the timings and voltages are normalized irrespective of pass device N10 of FIG. 2 characteristics, thereby providing short circuit protection without measuring the current through pass device N10.

It should be noted that the above-described circuit detects short-circuit conditions that exist during startup of the power supply. Short-circuit conditions that occur subsequent to insertion and startup may be detected by a voltage change detector 38 coupled to the gate of the pass device. A short-circuit that suddenly occurs either due to a failure of the hot-swappable subsystem or due to misconnnection such as might occur during extraction of the hot-swappable subsystem will cause a sudden change in the voltage at terminal gate, due to the parasitic capacitance between the gate and drain of pass device N10 of FIG. 2. Voltage change detector 38 then signals switch logic 34 to restart or shut down operation of the power supply.

One or more counters may be maintained within switch logic 34 to limit the number of retries attempted at startup or detection of short-circuit conditions. Switch S2 may also be controlled by other logic within switch logic 34 to provide an initial delay for providing a power-on-reset interval and further by a voltage sensing circuit 36 coupled to the power supply input voltage to provide under-voltage lockout protection. As described above in the text accompanying FIG. 2, the under-voltage lockout level may be programmed by inserting a zener diode or other device in series with the power supply input to the hot-swap power supply.

A novel circuit may be used to circumvent the initial transient feed-through that occurs when a load is connected to the hot swap power supply. The capacitive ladder formed by $C_{gs}$, $C_{gd}$ and $C_{Load}$ turns on N10 of FIG. 2 in the absence of circuitry controlling the gate voltage, which happens during the startup of a hot-swap power supply. A transistor N14 provides a path to ground for charge appearing at the gate of pass device N10. Since transistor N14 is a depletion MOSFET, until $V_{L3}$ reaches a voltage higher than the voltage at the gate terminal plus $V_{po}$ (the pinch-off voltage of transistor N14), transistor N14 will conduct, drawing the gate of pass device N10 to ground. Reference voltage $V_{L3}$ is coupled to an internal reference such as an internal regulator output. As reference voltage $V_{L3}$ rises, transistor N14 will begin to turn off and when reference voltage $V_{L3}$ reaches $V_{dd}+V_{po}$, transistor N14 will be turned completely off. Transistor N14 will be held in an off state permanently unless the input voltage to the hot-swap power supply falls too low. A resistor R11 is coupled to the gate of transistor N14 so that the gate voltage is maintained at ground potential until the reference circuit producing $V_{L3}$ has reached a stable voltage. Alternative circuits may be used to clamp the gate terminal such as a bipolar transistor or a darlington pair coupled to the gate terminal with a base connected to an internal voltage reference that is available as the input voltage rises. The bipolar transistors are then disabled once the control electronics 24 circuits become operational. The depletion mode transistor N14 implementation is preferred since it will conduct at startup and continue to conduct until the circuits within control electronics 24 become operational.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A power supply circuit for detachably coupling a hot-pluggable subsystem, wherein said power supply circuit comprises:
a power supply output for supplying power to a load;
a pass device coupled to said power supply output for controlling said supplied power; and
a control circuit coupled to a gate of said pass device, wherein said control circuit detects a gate voltage of said pass device and controls said pass device in conformity with said gate voltage, wherein said control circuit samples and holds a representation of a current required to produce said gate voltage, and wherein said current representation is used subsequently to control said pass device.

2. A power supply circuit for detachably coupling a hot-pluggable subsystem, wherein said power supply circuit comprises:
a power supply output for supplying power to a load;
a pass device coupled to said power supply output for controlling said supplied power; and
a control circuit coupled to a gate of said pass device, wherein said control circuit detects a gate voltage of said pass device and controls said pass device in conformity with said gate voltage, and wherein said control circuit further comprises a voltage change detector coupled to said gate of said pass device for detecting changes in said gate voltage due to a short-circuit condition occurring on said power supply output.

3. A power supply circuit for detachably coupling a hot-pluggable subsystem, wherein said power supply circuit comprises:
a power supply output for supplying power to a load;
a pass device coupled to said power supply output for controlling said supplied power; and
a control circuit coupled to a gate of said pass device, wherein said control circuit detects a gate voltage of said pass device and controls said pass device in conformity with said gate voltage, wherein said control circuit determines that a short-circuit condition exists on said power supply output by detecting the difference in a rate of change of said gate voltage due to said short-circuit condition reducing a miller effect that would otherwise reduce said rate of change further, and wherein said control circuit disables said pass device by controlling said gate voltage if said short-circuit condition exists on said output.

4. The power supply circuit of claim 1, wherein said control circuit comprises a timing circuit for determining a time period and wherein said control circuit determines that said short-circuit condition exists by detecting that said gate voltage is not exhibiting a predetermined amount of miller effect rate of change reduction.

5. The power supply circuit of claim 4, wherein said timing circuit comprises a ramp generator for generating a linearly increasing voltage ramp and a first comparator coupled to said ramp generator whereby said first comparator determines that said time period has elapsed when said voltage ramp has reached a threshold, and wherein said control circuit comprises a second comparator coupled to said gate of said pass device for determining that said gate voltage does not exhibit said miller effect rate of change reduction by determining that said gate voltage has exceeded a second threshold before said time period has elapsed.

6. A power supply circuit for detachably coupling a hot-pluggable subsystem, wherein said power supply circuit comprises:
a power supply output for supplying power to a load;
a pass device coupled to said power supply output for controlling said supplied power; and
a control circuit coupled to a gate of said pass device, wherein said control circuit detects a gate voltage of said pass device and controls said pass device in conformity with said gate voltage, and wherein said control circuit comprises a transconductor coupled to an output of said ramp generator, and a current mirror coupled to an output of said transconductor and further coupled to said gate of said pass device for forcing said gate voltage to follow said voltage ramp until said voltage ramp has reached said threshold.

7. The power supply circuit of claim 1, wherein said control circuit comprises a restart circuit for restarting charging of said gate after said control circuit determines that said short-circuit condition exists.

8. A power supply circuit for detachably coupling a hot-pluggable subsystem, wherein said power supply circuit comprises:
   a power supply output for supplying power to a load;
   a pass device coupled to said power supply output for controlling said supplied power; and
   a control circuit coupled to a gate of said pass device, wherein said control circuit detects a gate voltage of said pass device and controls said pass device in conformity with said gate voltage, and wherein said control circuit comprises an under-voltage lockout circuit for detecting that a voltage supplied to said pass device is insufficient for proper operation of said power supply, and wherein said control circuit prevents charging of said gate unless said voltage supplied to said pass device is sufficient for proper operation.

9. A power supply circuit for detachably coupling a hot-pluggable subsystem, wherein said power supply circuit comprises:
   a power supply output for supplying power to a load;
   a pass device coupled to said power supply output for controlling said supplied power; and
   a control circuit coupled to a gate of said pass device, wherein said control circuit detects a gate voltage of said pass device and controls said pass device in conformity with said gate voltage, and wherein said control circuit comprises a power-on-reset circuit for delaying charging of said gate for a predetermined time interval.

10. A power supply circuit for detachably coupling a hot-pluggable subsystem, wherein said power supply circuit comprises:
    a power supply output for supplying power to a load;
    a pass device coupled to said power supply output for controlling said supplied power; and
    a control circuit coupled to a gate of said pass device, wherein said control circuit detects a gate voltage of said pass device and controls said pass device in conformity with said gate voltage, and wherein said control circuit further comprises a normally-on shunt device coupled to said gate of said pass device, and wherein said shunt device clamps the voltage of said gate of said pass device until said control circuit reaches a predetermined operating voltage.

11. The power supply circuit of claim 10, wherein said normally-on shunt device is a depletion mode field effect transistor.

12. A method for controlling a power supply current from a power supply output coupled to a hot-pluggable subsystem, wherein said power supply current is conducted through a pass device having a gate, said method comprising:
    supplying a current to said gate;
    detecting a gate voltage of said pass device;
    subsequently controlling said pass device in conformity with said detected gate voltage; and
    sampling said gate voltage and wherein said controlling is performed in conformity with said sampled gate voltage.

13. A method for controlling a power supply current from a power supply output coupled to a hot-pluggable subsystem, wherein said power supply current is conducted through a pass device having a gate, said method comprising:
    supplying a current to said gate;
    detecting a gate voltage of said pass device; and
    subsequently controlling said pass device in conformity with said detected gate voltage, and wherein said detecting includes detecting changes in said gate voltage due to a short-circuit condition occurring on said power supply output.

14. A method for controlling a power supply current from a power supply output coupled to a hot-pluggable subsystem, wherein said power supply current is conducted through a pass device having a gate, said method comprising:
    supplying a current to said gate;
    detecting a gate voltage of said pass device;
    subsequently controlling said pass device in conformity with said detected gate voltage; and
    clamping said gate voltage during startup with a normally-on shunt device, whereby no supply voltage is necessary to perform said clamping.

15. A power supply control circuit having exactly three electrical connections, comprising:
    a first electrical connection terminal for connecting to a source of direct current;
    a second electrical connection terminal for connecting to a ground reference associated with said source of direct current;
    a third electrical connection terminal for connecting to a gate of an pass device external to said power supply control circuit, wherein said pass device has a channel coupled between said source of direct current and a hot-pluggable subsystem power connection; and
    a control circuit coupled to said third electrical connection terminal, wherein said control circuit controls charging of said pass device in conformity with a voltage of said third electrical connection terminal.

16. The power supply circuit of claim 15, wherein said control circuit further comprises a voltage change detector coupled to said third electrical terminal for detecting a change in said gate voltage due to a short-circuit condition occurring on said power supply output.

17. The power supply circuit of claim 15, wherein said control circuit further comprises a normally-on shunt device coupled to said third electrical terminal, and wherein said shunt device clamps the voltage of said gate of said pass device until said control circuit reaches a predetermined operating voltage.

18. The power supply circuit of claim 15, wherein said control circuit further comprises an under-voltage lockout protection circuit coupled to said first electrical connection terminal for detecting that a voltage supplied to said pass device is insufficient for proper operation of said power supply, and wherein said control circuit prevents charging of said gate unless said voltage supplied to said pass device is sufficient for proper operation, and whereby said under-voltage lockout protection may be varied by coupling said first electrical connection terminal to said source of direct current through a voltage-dropping component.

19. A power supply circuit having exactly three electrical connections, comprising:
 a first electrical connection terminal for connecting to a source of direct current;
 a second electrical connection terminal for connecting to a ground reference associated with said source of direct current;
 a third electrical connection terminal for connecting to a hot-pluggable subsystem power input;
 a pass device having a channel coupled between said first electrical connection terminal and said third electrical connection terminal; and
 a control circuit coupled to a gate of said pass device, wherein said control circuit detects a gate voltage of said pass device and controls charging of said pass device in conformity with said gate voltage.

20. The power supply circuit of claim 19, wherein said control circuit comprises a mirror element having characteristics matched to characteristics of said pass device, wherein said mirror element has a gate coupled to said gate of said pass device for creating a scaled current proportional to a current through said channel of said pass device whereby said control circuit controls charging of said pass device.

21. The power supply circuit of claim 19, wherein said control circuit further comprises a short circuit detector coupled to said mirror element for detecting changes in said scaled current due to a short-circuit condition occurring on said power supply output.

22. The power supply circuit of claim 19, wherein said control circuit further comprises a normally-on shunt device coupled to said gate of said pass device, and wherein said shunt device clamps the voltage of said gate of said pass device until said control circuit reaches a predetermined operating voltage.

23. A power supply circuit for detachably coupling a hot-pluggable subsystem, wherein said power supply circuit comprises:
 a power supply output for supplying power to a load;
 a pass device coupled to said power supply output for controlling said supplied power; and
 a control circuit coupled to a gate of said pass device, wherein said control circuit comprises a normally-on shunt device coupled to said gate of said pass device, and wherein said shunt device clamps the voltage of said gate of said pass device until said control circuit reaches a predetermined operating voltage, and wherein said normally-on shunt device is a depletion mode transistor having a channel coupled between said gate of said pass device and a power supply rail and a gate coupled to a reference voltage of said control circuit, whereby said normally-on shunt device is turned off when said reference voltage is active.

24. The power supply circuit of claim 23, further comprising at least one internal regulator for supplying a power supply voltage to said control circuit, and wherein said reference voltage is an output of said regulator.

25. A power supply circuit for detachably coupling a hot-pluggable subsystem, wherein said power supply circuit comprises:
 a power supply input for connection to a source of direct current;
 a power supply output for supplying power to a load;
 a pass device coupled to said power supply output and further coupled to said power supply input for controlling said supplied power; and
 a control circuit coupled to a gate of said pass device, wherein said control circuit comprises an under-voltage lockout protection circuit for detecting that a voltage supplied to said pass device is insufficient for proper operation of said power supply circuit, and wherein said control circuit prevents charging of said gate unless said voltage supplied to said pass device is sufficient for proper operation, and whereby said under-voltage lockout protection level may be varied by coupling said power supply input to said source of direct current through a voltage-dropping component.

* * * * *